United States Patent [19]

Szymczak et al.

[11] Patent Number: 4,753,468
[45] Date of Patent: Jun. 28, 1988

[54] MOVABLE VEHICLE GRILLE

[75] Inventors: Gerald W. Szymczak, Warren; John H. Schult, Jr., Royal Oak, both of Mich.

[73] Assignee: Chrysler Motors Corporation, Highland Park, Mich.

[21] Appl. No.: 69,805

[22] Filed: Jul. 2, 1987

[51] Int. Cl.⁴ .............................................. B60R 19/02
[52] U.S. Cl. .................................. 293/132; 180/68.6; 293/115
[58] Field of Search ............... 293/132, 115; 180/68.6, 180/274

[56] References Cited

U.S. PATENT DOCUMENTS 2,905,286 9/1959 Adams et al. ........................ 189/82
3,792,889 2/1974 Fuener et al. ......................... 293/63
4,566,555 1/1986 Schlanger .......................... 180/274
4,645,250 2/1987 Bauer et al. ......................... 293/115

Primary Examiner—Robert R. Song
Attorney, Agent, or Firm—Edward A. Craig

[57] ABSTRACT

A movable vehicle grille is provided. The grille is attached to the vehicle by means of a crank structure which causes the grille to pivot and to also move inwardly and upwardly when impacted by the vehicle bumper. The vehicle bumper is of the type mounted on an energy absorbing means to facilitate rearward and upward movement thereof upon impact with another vehicle or a fixed object. Spring means are provided to urge the grille back to its normal position after the bumper retracts.

7 Claims, 3 Drawing Sheets

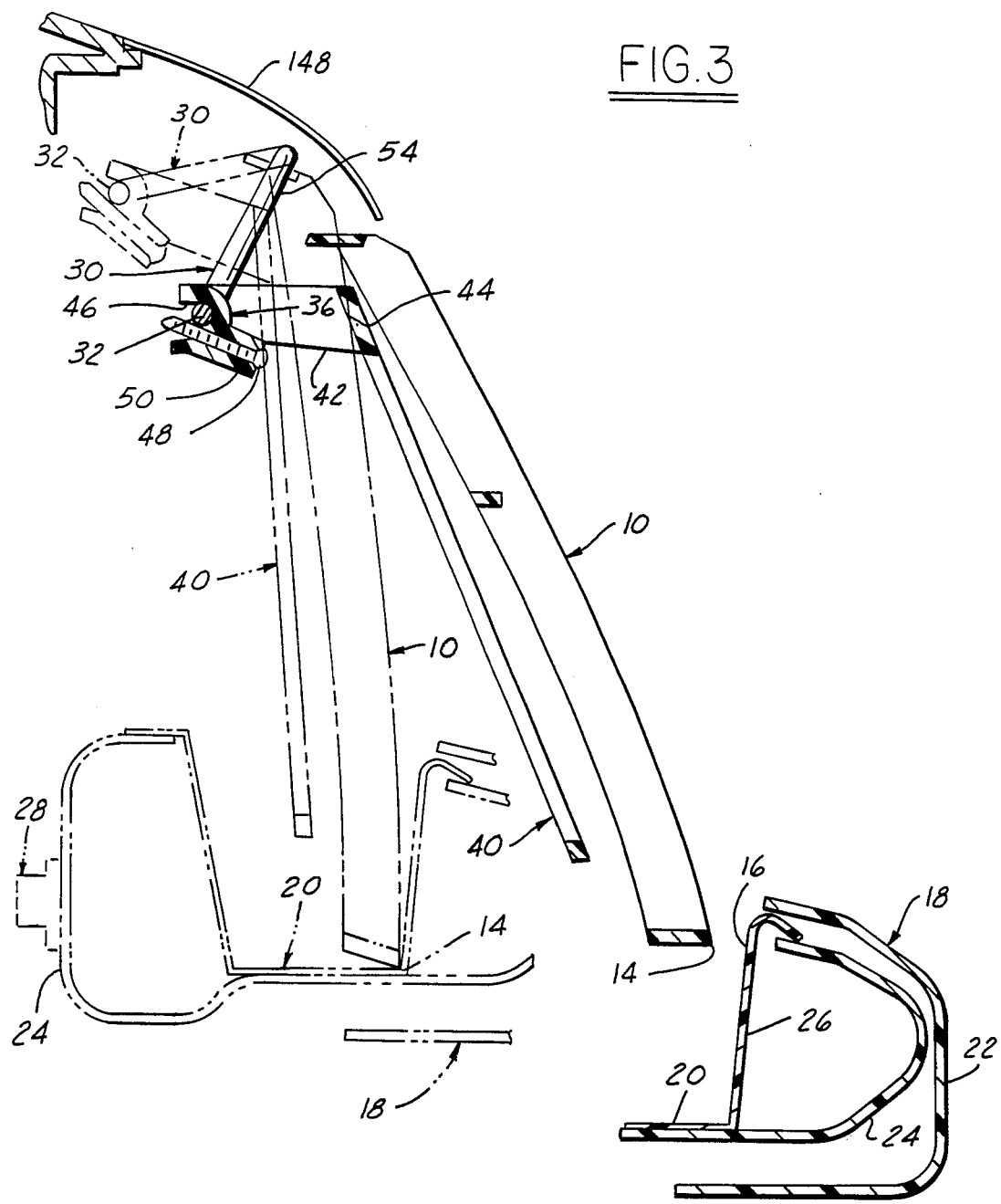

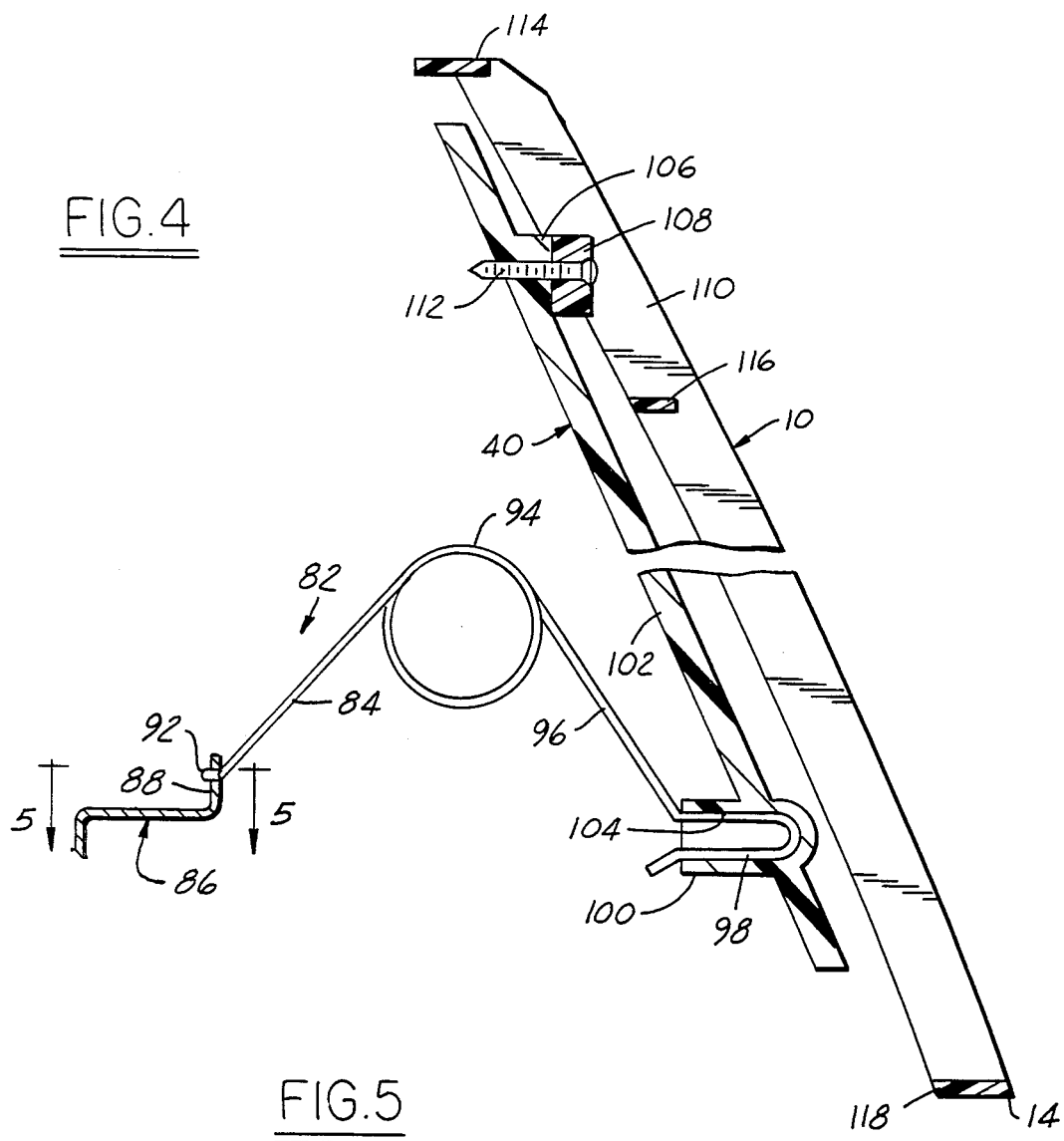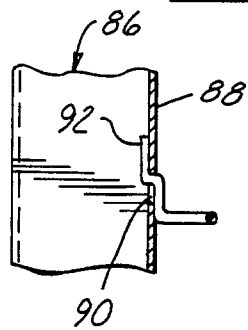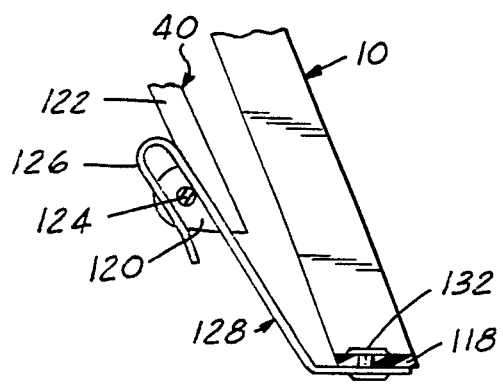

MOVABLE VEHICLE GRILLE

BACKGROUND OF THE INVENTION

1. Field of the Invention

This invention relates to a movable vehicle grille which is displaced after front bumper movement which occurs upon impact of the bumper.

2. Prior Art

Government regulations have mandated that bumpers of vehicles be so constructed and mounted as not to be damaged as a consequence of low speed impact with other vehicles or fixed structure. The prevailing method for accomplishing this has been to mount the bumper onto the vehicle by means of an energy absorbing device such as a shock absorbing structure. When the bumper is impacted at low speeds, the energy absorbing device collapses, absorbing the energy of impact. This collapse takes with it the bumper which moves towards the vehicle. After being impacted, the energy absorbing devices bias the bumper back to its normal position.

One problem which has been encountered with such structure is the maintenance of the integrity of grilles provided on the front ends of vehicles with portions thereof directly behind the bumper. As the bumper is moved toward the vehicle, the bumper will impact the grille. If the grille is a rigid piece and rigidly mounted, it will be damaged upon impact with the bumper. One solution to this problem has been the use of pivotally mounted grilles which are free to swing inwardly upon bumper impact. An example of such a construction is illustrated in U.S. Pat. No. 3,792,889. Another technique which has been used is to attach the grille to the bumper so that the grille will move with the bumper. Such structures are shown in, for example, U.S. Pat. Nos. 2,905,286 and 4,566,555.

However, these solutions do not take into account the situation where the bumper not only moves inwardly but also upwardly. In such instances, the grille must not only move inwardly as by swinging or moving with the bumper but must also be capable of moving upwardly without damage to either the grille or associated structure.

In accordance with the present invention, structure is provided to not only cause pivoting of the grille upon bumper impact but also displacement of the grille inwardly and upwardly as the bumper moves inwardly and upwardly after impact.

SUMMARY OF THE INVENTION

The invention is adapted for use in connection with a vehicle of the type having a front bumper structure including energy absorbing means to facilitate rearward and upward movement of the bumper structure upon impact while absorbing energy of impact and to return the bumper structure to its normal forward position after impact.

The movable vehicle grille comprises a grille having a normal position on the front end of a vehicle with a lower edge positioned below and behind upper marginal edge portions of the bumper structure and over lower rearwardly extending bumper structure. A crank structure is provided behind the grille. The crank structure includes a first crank arm and first pivot means pivotably attaching the first crank arm to an upper portion of the grille. The crank structure also includes a second crank arm and second pivot means pivotably attaching the second crank arm to fixed interior vehicle structure. A third crank arm interconnects the first and second crank arms. The third crank arm is positioned at an angle which permits pivoting of the second crank arm in a direction to move the first crank arm upwardly and rearwardly when the grille is pushed upwardly. The lower edge of the grille is free to move whereby when the bumper is structure is moved rearwardly upon impact and impacts the grille, the grille will pivot about the first crank arm and when the bumper structure is moved upwardly upon impact and impacts the grille, the grille will cause the second crank arm to pivot and move the grille upwardly and rearwardly.

First spring means are provided to urge the grille to its normal position. The first spring means is effective to return the grille to its normal position upon return of the bumper structure to its normal forward position after impact. Preferably, the first spring means is a V-shaped spring structure having one leg connected to fixed vehicle structure and another leg connected to the grille. Second spring means are provided to urge the second crank arm to pivot back to its original position along with return of the grille to its normal position. Preferably, the second spring means comprises a torsion spring structure. A support frame is provided. The support frame is connected to the rear surface of the grille. The first crank arm and the first spring means are connected to the support frame.

Preferably, there are two spaced apart first crank arms and two third crank arms interconnecting the first crank arms to the second crank arm with each of the first crank arms being connected to the grille as aforesaid.

DESCRIPTION OF THE DRAWINGS

FIG. 3 is a sectional view taken substantially along the line 3—3 of FIG. 1 illustrating the positions of the grille before and after bumper impact;

FIG. 4 is a sectional view taken substantially along the line 4—4 of FIG. 1;

FIG. 5 is a view taken substantially along the line 5—5 of FIG. 4; and

FIG. 6 is a sectional view taken substantially along the line 6—6 of FIG. 1.

DESCRIPTION OF THE PREFERRED EMBODIMENT

Figure 1:
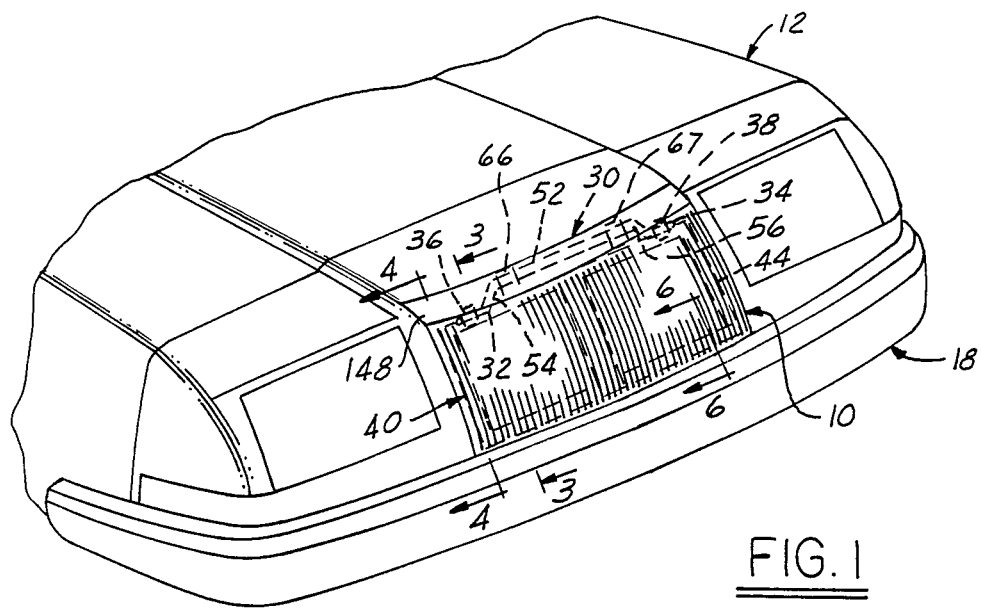
FIG. 1 is a perspective view of the front end of a car illustrating one embodiment of the movable vehicle grille of the present invention.

Referring to FIGS. 1 and 3, it will be noted that the movable vehicle grille 10 is mounted on the front end of a car 12 and is established in a normal position on the front end. In the normal position, the grille 10 has a lower edge 14 which is positioned below and behind upper marginal edge portions 16 of bumper structure 18. The lower edge 14 is also positioned over lower rearwardly extending bumper structure 20. The bumper structure 18 includes an outer externally positioned bumper element 22 and inner bumper elements 24, 26. An energy absorbing structure 28 is connected to the bumper element 24. Energy absorbing devices, such as shock absorbers, are provided to mount and bias the bumper elements in a normal position. The energy absorbing structure facilitates rearward and upwardly movement of the bumper structure upon impact while absorbing energy of impact and returns the bumper structure to its normal forward position after impact. Various energy absorbing structures are available and the specific type of energy absorbing device is not germane to the present invention. The function of the energy absorbing device is to permit movement of the bumper a short distance toward the vehicle after a low speed impact with another vehicle or stationary structure without appreciable damage to the bumper. Such bumper mounting constructions are common in the automotive industry at this time.

Figure 2:
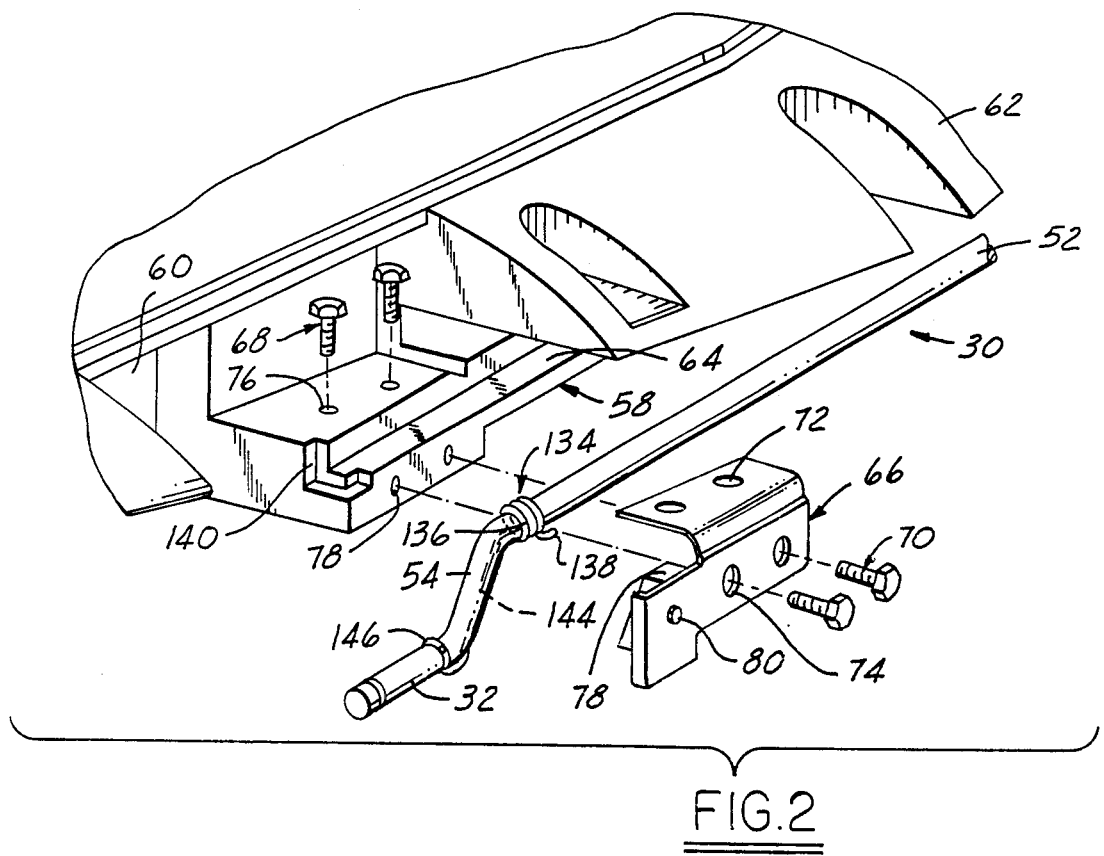
FIG. 2 is an exploded view in perspective illustrating the crank structure which permits the grille to be movable.

A crank structure 30, best shown in FIGS. 1, 2 and 3, is provided behind the grille 10. The crank structure includes two spaced apart first crank arms 32, 34. First pivot means 36, 38 pivotably attach the first crank arms to an upper portion of the grille. This attachment is made via a support frame 40 positioned behind the grille and connected to the rear surface of the grille. The frame 40 has inwardly extending projections 42 which extend from upper frame member 44. The projections 42 terminate in a recess 46 which forms a bearing structure for the first crank arms. The crank arms are held in place by means of a screw 48 which is threaded through an opening provided in a boss 50 after the crank arm has been inserted into the recess 46. The screw 48 does not prevent pivoting of the crank arm but rather acts as a portion of the crank arm bearing surface.

A second crank arm 52 is provided. The arm 52 extends between the pair of first crank arms 32, 34. It is interconnected to the first crank arms by means of a pair of third crank arms 54, 56.

The second crank arm 52 is pivotably mounted by means of second pivot means 58. The second pivot means are attached to fixed interior vehicle structure 60 and extend beneath a header support structure 62. The second pivot means 58 has an L-shaped configuration with a forward channel 64 which receives the second crank arm 52. The crank arm 52 is held in place by means of brackets 66, 67 which are secured in place by means of two sets of screws 68, 70 which pass through pairs of openings 72, 74 in the brackets and are received in threaded openings 76, 78. A bracket is provided at each end of the pivot means 58.

As will be noted, the third crank arms 54, 56 are angled downwardly. These arms are guidingly received on projecting structure 78 of the bracket 66. This structure is held in place by means of a fastener 80. The header support 62 and pivot means 58 are integrated into one piece and fabricated of molded fiberglass.

First spring means 82 as shown in FIGS. 4 and 5, are provided to urge the grille 10 to its normal position. The spring means 82 is of spring wire construction and has a V-shape. One leg 84 is connected to fixed vehicle structure 86. The structure 86 is a framing cross-member and has an upwardly extending flange 88 with opening 90 therein as shown in FIG. 5. The end 92 of the leg 84 is bent into an S-shape and is received in the opening 90 to secure the spring leg in place.

The apex 94 of the spring means 82 is bent into a coil shape to provide torsion spring action to assist the spring legs in urging the grille 10 in the desired direction. The second spring leg 96 extends from the apex 94 and terminates in a U-shaped portion 98. A projection 100 is provided in vertical frame member 102 which is located near the outer end of the grille 10. The projection 100 has a recess 104 which receives U-shaped portion 98 of the spring leg and holds the spring leg in place. A spring structure 82 is provided at each end of the grille 10 to evenly urge the grille 10 to its normal position. As will be appreciated, the spring means 82 will contract upon movement of the grille 10 inwardly and will bias the grille 10 back to its normal position when permitted to do so by retraction of the bumper structure after impact.

The method of attachment of the support frame 40 to the grille 10 is illustrated in FIGS. 4 and 6. As will be therein noted, a boss 106 is provided on the upper portion of the vertical frame member 102. A mating boss 108 is provided between a pair of the vertical blades 110 which form the grille structure. An opening is provided in the boss 108 and a threaded opening is provided in the boss 106. A screw 112 is provided and extends through these openings to secure the frame to the grille. A similar structure is provided on the other side of the grille to securely maintain the upper portion of the frame in place with respect to the grille. As will be noted, the blades 110 of the grille are held together by means of cross pieces 114, 116, 118 as is common practice.

FIG. 6 illustrates the structure for securing the lower end of the frame 40 to the grille 10. As will be noted, a projection 120 is provided on the lower end of vertical frame member 122. A pin 124 extends sidewardly from projection 120. A hook 126 of a fastener 128 loosely surrounds the pin 124. The lower end 130 of the fastener 128 and is secured to lower grille cross-piece 118 by means of a rivet 132. The loose connection of the hook 126 with the pin 124 permits dimensional variations to occur in the related structures. A plurality of such fasteners 128 are provided.

Second spring means 134 are provided at each end of the second crank arm 52 to urge the arm to pivot back to its original position along with the return of grille 10. The spring means 134 are best shown in FIG. 2. As will be noted, the spring means comprises a coil portion 136 which functions as a torsion spring. An inturned end 138 bears against the surface of a notch 140 provided in the end of the extends from the coil 136. The lower end of the arm 144 is secured to a first spring arm by means of a coil 146 to thereby secure the other coil 136 against turning upon pivoting of the crank. The end 138 will thus cause the coil 136 to tighten upon pivoting of the arm. The spring means 134 urge the second crank arm 52 back to its original position along with return of the grille to its normal position.

Operation of the crank system may best be seen in FIG. 3. As will be therein noted, the grille 10 has a normal position shown in full lines which is spaced slightly rearwardly of the bumper structure 18 which is also shown in full lines in its normal position. When the bumper structure 18 is impacted, it will move to the left as viewed in FIG. 3. After a short movement, the upper marginal edge portion 16 of the bumper structure will contact the lower edge 14 of the grille 10 causing the grille 10 to pivot about the first crank arms 32, 34.

As will be noted, a decorative header 148 is located directly above the upper end of the grille 10. Initially pivoting movement of the grille 10 will not result in the grille 10 touching the header 148 and thereby causing any damage. However, upon upward movement of the bumper structure as illustrated in dotted lines, the lower edge 14 will eventually be contacted by the lower bumper structure 20 thereby pushing the grille 10 upwardly. When this occurs, the upward force on the first crank arms 32, 34 will translate via the third crank arms 54, 56 into a force causing pivoting of the second crank arm 52.

As will be noted in FIG. 3, the third crank arms 54, 56 are positioned at an angle which permits pivoting of the second crank arm 52 in a direction to move the first crank arms 32, 34 upwardly and rearwardly when the grille is pushed upwardly by the bumper structure. To permit this cranking action, it is necessary that the third crank arms 52, 54 be angled downwardly and rearwardly as shown in FIG. 3. Upon such movement, the grille 10 is moved to the position shown in dotted lines wherein it misses contact with the header 148 and does not cause any damage to this element or the grille. The reverse action will occur when the grille 10 is moved back to its normal position via the spring means 82, 134.

We claim:

1. In a vehicle of the type having a front bumper structure including energy absorbing means to facilitate rearward and upward movement of the bumper structure upon impact while absorbing energy of impact and to return the bumper structure to its normal forward position after impact, the combination comprising a grille having a normal position on the front end of the vehicle with a lower edge positioned below and behind upper marginal edge portions of the bumper structure and over lower rearwardly extending bumper structure, a crank structure behind the grille including a first crank arm, first pivot means pivotably attaching the first crank arm to an upper portion of the grill, a second crank arm, second pivot means pivotably attaching the second crank arm to fixed interior vehicle structure, a third crank arm interconnecting the first and second crank arms, the third crank arm being positioned at an angle which permits pivoting of the second crank arm in a direction to move the first crank arm upwardly and rearwardly when the grille is pushed upwardly, the lower edge of the grille being free to move whereby when the bumper structure is moved rearwardly upon impact and impacts the grille, the grille will pivot about the first crank arm and when the bumper structure is moved upwardly upon impact and impacts the grille, the grille will cause the second crank arm to pivot and move the grille upwardly and rearwardly.

2. The combination of claim 1, further characterized in the provision of first spring means urging the grille to its normal position, said first spring means being effective to return the grille to its normal position upon return of the bumper structure to its normal forward position after impact.

3. The combination of claim 2, further characterized in that the first spring means is a V-shaped spring structure having one leg connected to fixed vehicle structure and another leg connected to the grille.

4. The combination of claim 2, further characterized in the provision of second spring means urging the second crank arm to pivot back to its original position along with return of the grille to its normal position.

5. The combination of claim 4, further characterized in that the second spring means comprises a torsion spring structure 6. The combination of claim 2, further characterized in the provision of a support frame connected to the rear surface of the grille, the first crank arm and the first spring means being connected to the support frame.

7. The combination of claim 1, further characterized in the provision of two spaced apart first crank arms and two third crank arms interconnecting the first crank arms to the second crank arm, each of the first crank arms being connected to the grille as aforesaid.

* * * * *